(12) United States Patent
Kallakuri et al.

(10) Patent No.: US 8,924,348 B2
(45) Date of Patent: Dec. 30, 2014

(54) SYSTEM AND METHOD FOR SHARING DATA BETWEEN OCCASIONALLY CONNECTED DEVICES AND REMOTE GLOBAL DATABASE

(75) Inventors: Sankalp Kallakuri, Mumbai (IN); Arpan Ghanto, Mumbai (IN); Suresh Cherusseri, Chennai (IN)

(73) Assignee: Tata Consultancy Services Limited, Maharashtra (IN)

( * ) Notice: Subject to any disclaimer, the term of this patent is extended or adjusted under 35 U.S.C. 154(b) by 275 days.

(21) Appl. No.: 13/378,725

(22) PCT Filed: Aug. 31, 2010

(86) PCT No.: PCT/IN2010/000580
§ 371 (c)(1),
(2), (4) Date: Dec. 16, 2011

(87) PCT Pub. No.: WO2011/125065
PCT Pub. Date: Oct. 13, 2011

(65) Prior Publication Data
US 2012/0290531 A1    Nov. 15, 2012

(30) Foreign Application Priority Data
Apr. 5, 2010    (IN) .......................... 1135/MUM/2010

(51) Int. Cl.
*G06F 17/00*    (2006.01)
*G06F 7/00*    (2006.01)
*G06F 17/30*    (2006.01)

(52) U.S. Cl.
CPC ................................ *G06F 17/30575* (2013.01)
USPC ....................................................... 707/620

(58) Field of Classification Search
USPC .......................................................... 707/639
See application file for complete search history.

(56) References Cited

U.S. PATENT DOCUMENTS

| | | | |
|---|---|---|---|
| 7,546,286 B2 | 6/2009 | Dickinson et al. | |
| 8,037,110 B2 | 10/2011 | Salgado et al. | |
| 2002/0133508 A1* | 9/2002 | LaRue et al. | 707/202 |
| 2004/0015504 A1* | 1/2004 | Ahad et al. | 707/100 |
| 2005/0021571 A1* | 1/2005 | East | 707/201 |
| 2005/0193028 A1* | 9/2005 | Oswalt | 707/200 |
| 2006/0123010 A1* | 6/2006 | Landry et al. | 707/10 |
| 2008/0189439 A1* | 8/2008 | Chitre et al. | 709/248 |
| 2009/0313495 A1* | 12/2009 | Krishnan et al. | 713/600 |

* cited by examiner

*Primary Examiner* — Alicia Lewis
(74) *Attorney, Agent, or Firm* — Hayes Soloway P.C.

(57) ABSTRACT

A method for sharing data between an occasionally connected device and a remote global database is disclosed. The occasionally connected device receives data from a remote global database. The data is accessed by a user in an online mode. The data is stored in the form of one or more screen instances in a local database of the occasionally connected device. The one or more screen instances capture contents of a screen accessed by the user, and the one or more screen instances are last viewed instances of the screen accessed by the user. Further, the one or more screen instances are updated in the offline mode by querying the local database of the occasionally connected device. The one or more updated screen instances are synchronized with the remote global database to update the data stored in the remote global database corresponding to the one or more screen instances.

6 Claims, 3 Drawing Sheets

SYSTEM AND METHOD FOR SHARING DATA BETWEEN OCCASIONALLY CONNECTED DEVICES AND REMOTE GLOBAL DATABASE

FIELD OF THE INVENTION

The present invention relates to an efficient method of offline and online data sharing and more particularly relates to a system and method for deployment and maintenance of lightweight local databases on the Occasionally Connected Devices (OCDs) and synchronization of data between the local database and the Remote Global Database (RGDb).

BACKGROUND OF THE INVENTION

Offline clients and Occasionally Connected Devices (OCDs) need a way to persist changes carried out locally while they are offline. Once they are online these changes can be streamed to the remote server for further processing and storage. There are several reasons a client or a device may need to be offline. For example, in modern day scenario, though internet connectivity is available in most public places but may be unavailable in certain client locations for the sake of security. Another reason to accomplish a set of actions offline and then synchronize the changes with the remote server is to lessen the load on the remote server trying to support several users logged in at once. Also since offline activities are accessing local storage there is a performance improvement over fully connected devices which are always connected to the remote server and need to access remote storage.

US20090171679 filed by Salgado et al. teaches that architecture for uninterrupted access to business data by enabling work on rich client machines to be stored in a local business data cache that is always available. A dispatching mechanism executes read/write requests against the local cache transparently to a client application, an automatic synchronization mechanism propagates changes bi-directionally when the client goes online and a live connection with the corresponding backend data source is available. A declarative data access model is employed based on operation stereotyping and grouping that enables client applications to transparently execute create, read, update, delete, query (CRUDQ) and association operations against the local cache as if executed against the actual business data source. The architecture supports the offline creation of entities and sets of related entities when the entity identifiers are generated by the business data source and offline navigation of entity associations when foreign keys are not present in the related entities. It supports the concept of offline behavior and improves the performance of the offline or thin client. However, the database used in this invention is structural replica of the RGDb, so it consumes more footprint memory of the device and more complex to maintain structural replica of the RGDb in the offline or thin client.

U.S. Pat. No. 7,546,286 filed by Dickinson et al teaches that methods, systems and computer products are provided for allowing bi-directional communication between a database application and a remote data source and for allowing updating of data on a remote data source with data edited or created at a client site remote from the remote data source during an offline data editing or entry session via a client database application. It supports the concept of offline behavior and improves the performance of the offline or thin client. However, the database used in this invention is relational at the RGDb, so creating and maintaining all relationships which are present in the RGDb within the local database are prohibitive in enterprise applications.

In case of data sharing between multiple hosts and data servers, for efficient data sharing a light and easily maintainable local database deployment on the OCD is desirable. The said lightweight local database preferably be created and maintained locally. The general data management practices followed in the industry, especially for data sharing and dissemination includes enterprise applications having thousands of tables and terabytes of data on their remote servers. The local databases on the clients need to be populated with very user specific and context specific data. This particular need is address in the prior art and is being commercially practiced, wherein the local database on an OCD is instantiated as a replica of the RGDb in of the form of its structures and contents. This particular practice of replication of an instance of the RGDb on the OCD, upon querying by the user thereof, though useful, is not an efficient means. Precisely, taking into consideration the computational limitations of the OCD, the replicas so created on the OCD. This results in large and complicated database locally which would be very sparsely populated.

Another significant technical aspect in data sharing is of updating the databases at both the ends. The changes made to the RGDb either in terms of structures or contents would have to be usually repeated locally, the said operation is accomplished by means of replication in the prior art. This operation would prove to be prohibitive for applications with large user bases. Microsoft Sync Framework is one of the commercial systems available in the market which typically exemplifies the solutions offered for updation. The product details are available at http://code.msdn.microsoft.com/sync.

The Microsoft Sync Framework is a tool to synchronize databases. It works between client servers or peer to peer setups. The sync framework is capable of synchronizing between relational databases. It is also capable of synchronizing between data sources such as XML files which are non-relational. Synchronizing screen based storage in non relational objects is possible using this technology. Synchronizing databases between client server setup is successfully, though not efficiently, implemented in the prior art. However, synchronization in a peer to peer environment is difficult to implement because of context specific and user specific data that is stored in the local database. Microsoft Sync Framework follows an approach of synchronize databases of peer computers connected to the network. These solutions are preferably suited to fully connected devices which have thick clients. For occasionally connected clients and thin clients, the synchronization offers technical problems of deployment and performance.

In one of the state of arts in this technology, Google Inc's product 'Google Gears' is recommended only for private computers because the database is used weren't encrypted. Google has launched and still in use 'SQLite' for local storage and for Gmail offline client (i.e. OCD). Hence, there is a strong requirement for encrypted databases.

The solution to the problems of deployment and performance improvement for OCD and thin clients are not being satisfactorily addressed in the prior-art. Alternatively, Adobe Air can be bundled with a SQLite database for creation and maintenance of the local database. This is done by inserting SQL statements within the Action Script code of the application. The application database in this case is stored in a single file at a designated location in the memory, thus offering quick access to the data and resolving the performance improvement issues. However, the said practice fails to simulate the structure of the actual full fledge database and still have issues related to deployment and maintenance of relations and DDL objects.

Therefore, while offline the OCDs perhaps are not capable to exploit the relational support and data accessibility features extended to it while it is online. Hence, there is an urgent need of an alternate solution for local deployment and maintenance of the database at the OCD. The solutions taught in the prior art for having an efficient local database deployment and maintenance specially for OCDs as well as offline/mobile/thin clients which are synchronizable with the RGDb have shortcomings from deployment, maintenance, and performance perspective.

More particularly, the shortcomings are that the local database is the structural replicas of the RGDb. If very user and context specific data was brought to the local database then the local database may be sparsely populated, but, the overheads of creating and maintaining all relationships which are present in the RGDb are prohibitive in an Enterprise application scenario where thousands of users would be having offline databases which would need to be centrally synchronized with the RGDb in terms of its structures. Yet another shortcoming with the prior art is concerning the use of replica databases, with the use of replica database at the OCD, the local database doesn't remain a light weight, which further adds to affecting the run time performance of the local database in online as well as in offline mode of operations.

Thus, in the light of the above mentioned prior art, it is evident that for run time performance enhancement, simple deployment, and maintenance, there is a need to create lightweight local databases for as OCD including future smart data access devices, mobile/thin/offline clients. Yet another urgent requirement is achieving optimum synchronization while sharing of data between the OCD and the RGDb.

OBJECTIVES OF THE INVENTION

The principle objective of the present invention is to deploy lightweight local databases on Occasionally Connected Devices (OCDs) so as to achieve increased ease of maintenance, deployment, performance, and data synchronization.

Another significant objective of the invention is to deploy a screen based database at the OCD, wherein only the instances of screens accessed by the end users and not the replica of Remote Global Database (RGDb) would be cached and available for access in an offline mode.

Another objective of the invention is to provide local database which is having a small footprint, low complexity and easy maintenance for OCD.

Yet another objective of the invention is to store the data instances on the screen in a single object in an OCD.

Yet another objective of the invention is to store data instances on the screen in multiple objects in an OCD wherein an object would be disintegrated into plurality of parameters those are associated with a single screen.

A still another objective of the invention is to identify each screen having multiple instances by a unique ID and each such instance is being accessible to the user at the OCD.

Still another objective of the invention is to identify each data instance by a unique ID.

Yet another objective of the invention is to capture the contents of each screen in the form of the one or more screen instances and caches a last viewed instance of the screen in the local database of the OCD while user is in an online mode.

Yet another objective of the invention is to synchronize the data contents. The data synchronization module is desired to save screens in the local database and stream the changes and updates carried out in the local database in an offline mode at the OCD to the RGDb while in an online mode.

SUMMARY OF THE INVENTION

Before the present systems and methods enablement are described, it is to be understood that this invention in not limited to the particular systems, and methodologies described, as there can be multiple possible embodiments of the present invention and which are not expressly illustrated in the present disclosures. It is also to be understood that the terminology used in the description is for the purpose of describing the particular versions or embodiments only, and is not intended to limit the scope of the present invention which will be limited only by the appended claims.

The present invention provides a system and method for deployment and maintenance of lightweight local databases on the Occasionally Connected Devices (OCD) and synchronization of data between the local database and the Remote Global Database (RGDb) by following sync paths to the RGDb through a middle layer, business logic layer and Orchestration Layer.

The system and method of the present invention facilitates data sharing between pluralities of OCDs and the RGDb. The database to be accessed by the user is generally located on at least one remote server which is communicatively coupled with the data access devices. Particularly, the system facilitates data sharing for an OCD at user end. As the OCDs are intended for offline use, a module for local data handling is provided. This module for local data handling is a lightweight non relational database.

In a significant embodiment of the present invention the data is stored in the form of objects on the occasionally connected devices. Each such stored object is captured in the form of a screen instance disposed at the OCD when the user is online. The stored objects have one or more contents stored therein one or more components. Each component possesses uniform shape, size, format, and semantics. Accordingly, the system of present invention provides a screen based non relational data sharing, wherein screens are means to capture and display the data shared in an online mode and invoke the data from the stored objects in an offline mode.

The screens are displayed on the OCD by means of a rendering engine and an object management engine stored therein the OCD. Wherein the object management engine is responsible for packing one or more contents of the screen accessed by the user into one or more objects and/or unpacking objects for screen display. The object management engine works in dual mode for rendering display of screens from the local storage as well as in sync with a data synchronization module from the RGDb.

The data synchronization module is responsible for synchronization of data instances from global into local databases by means of a download sync feature of a sync utility and from local into global databases by means of an upload sync feature of the sync utility. While upload sync at work, the objects stored at OCD are directly updated to the RGDb without intervention of the screens as a medium. However, during download sync operation data is stored in as object at OCD and captured in the form of screen. Thus, the sync utility is instrumental in updating the plurality data instances at local database of the OCD and at the RGDb. The synchronization of data instances at RGDb is done by sequentially transmitting objects through remote server having integration layer, business logic layer, orchestration layer to the RGDb.

The middle layer interacts with the data synchronization module during the data synchronization between the local database at OCD and the RGDb. The rendering engine is essentially deployed for displaying one or more data instances of the objects received from remote server on the screen, these instances are created and stored in one or more objects at the OCD. The application server hosts the middle layer and/or integration layer and a business logic layer. A separate process server hosts the orchestration logic and communicates with the middle layer. Thus, the middle layer is responsible for integration logic. The business rules and business process logic reside in the business logic layer and the orchestration layer respectively.

When the OCD user is online, he/she queries and accesses data from the RGDb, thus, generating at least one instance of the said accessed data. the instance of the data is captured in the screen by means of predefined components thereof for data handling, the said one or more screen instances are available on the OCD in an offline mode, the subsequent local changes and global structural and data specific changes are synchronized on the OCD and the RGDb in a next online session following the offline operation.

According to one of the embodiments of the invention, the invention is useful to create lightweight local databases for occasionally connected devices. In an essential embodiment of the present invention, screen based databases store only screens accessed by the end users containing tables and/or files that are created and associated with the respective screens. Thus the local database is tailor made to the users need and does not hold unwanted data or relationships.

According to one of the embodiments of the invention, the invention is useful to maintain data synchronization between the local screen based non-relational database and the remote relational global database for occasionally connected devices; the maintenance of screen based database can be done with ease locally and the maintenance is driven by the actions carried out by the end user.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings example constructions of the invention; however, the invention is not limited to the specific methods and system disclosed. In the drawings.

DETAILED DESCRIPTION OF THE INVENTION

Figure 1:
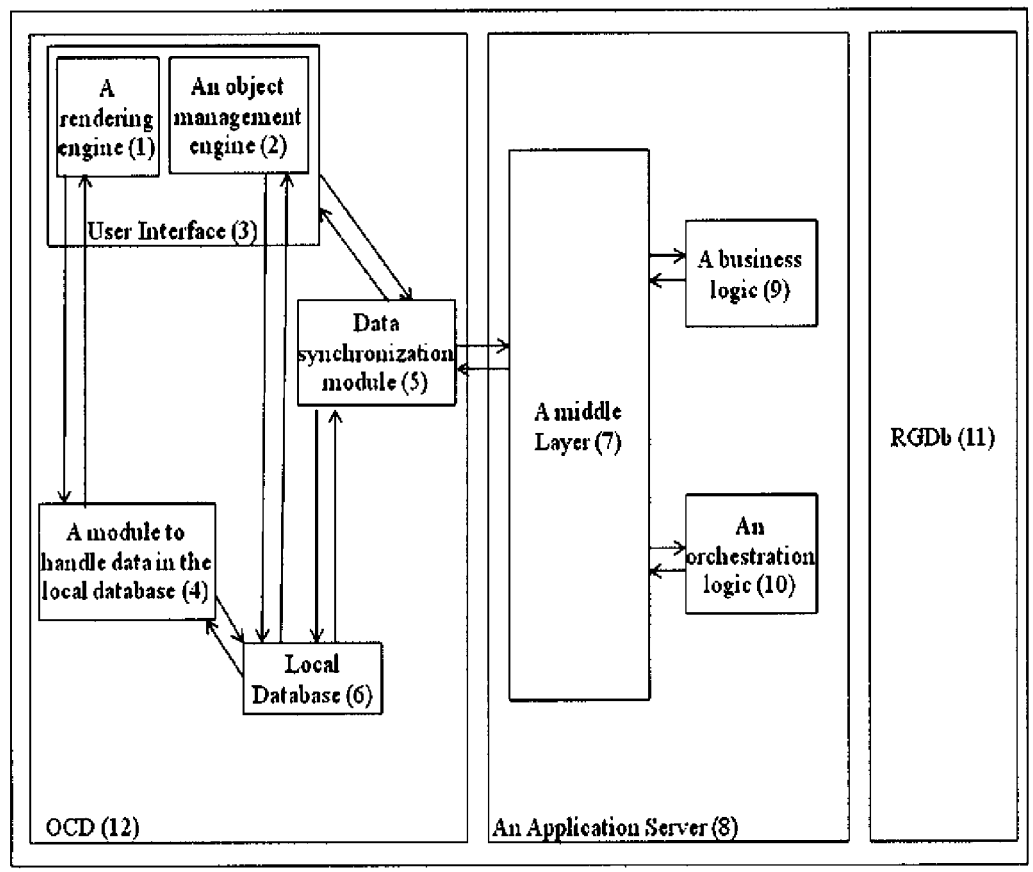
FIG. 1 shows a system and method for deployment and maintenance of lightweight local database on the Occasionally Connected Devices (OCD) and synchronization of data between the local database and the Remote Global Database (RGDb).

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.
Definitions Download Sync: The data synchronization is carried out by saving the screens in the local database in the Occasionally Connected Devices (OCDs) for "Download Sync"

Upload Sync: updates carried out in the offline mode are saved in the local database. The updates are steamed to the Remote Global Database (RGDb) when the client goes online. This is the "Upload Sync"

The present invention provides a system and method for deployment and maintenance of lightweight local databases on the OCD (12) and synchronization of data between the local database (6) and the RGDb (11) by following sync paths to the RGDb (11) through the middle layer(7), business logic layer (9) and Orchestration Layer(10).

The system and method of the present invention facilitates data sharing between pluralities of OCDs (12) and the RGDb (11). The database to be accessed by the user is generally located on at least one remote server which is communicatively coupled with the OCD (12). Particularly, the system facilitates data sharing for an OCD (12) at user end. As the OCD (12) are intended for offline use, a module for local data handling (4) is provided. This module for local data handling (4) is a lightweight non relational database.

In a significant embodiment of the present invention the data is stored in the form of objects on the OCD (12). Each such stored object is captured in the form of a screen instance disposed at the OCD (12) when the user is online. The stored objects have one or more contents stored therein one or more components. Each component possesses uniform shape, size, format, and semantics. Accordingly, the system of present invention provides a screen based non relational data sharing, wherein screens are means to capture and display the data shared in an online mode and invoke the data from the stored objects in an offline mode.

The screens are displayed on the OCD (12) by means of a rendering engine (1) and an object management engine (2) stored therein the OCD (12). Wherein the object management engine (2) is responsible for packing one or more contents of the screen accessed by the user into one or more objects and/or unpacking objects for screen display. The object management engine (2) works in dual mode for rendering display of screens from the local storage as well as through a data synchronization module (5) from the RGDb (11).

The data synchronization module (5) is responsible for synchronization of data instances from global into local databases (6) by means of a download sync feature of sync utility and from local into RGDb (11) by means of an upload sync feature of the sync utility. While upload sync at work, the objects stored at OCD (12) are directly updated to the RGDb (11) without intervention of the screens as a medium. However, during download sync operation data is stored in as object at OCD (12) and captured in the form of screen. Thus, the sync utility is instrumental in updating the plurality data instances at local database (6) of the OCD (12) and at the RGDb (11). The synchronization of data instances at RGDb (11) is sequentially transmits through an application server having a middle layer and/or integration layer (7) and a business logic layer (9).

The Middle layer (7) interacts with the data synchronization module (5) during the data synchronization between the local database (6) at OCD (12) and the RGDb (11). The rendering engine (1) is essentially deployed for displaying one or more data instances of the objects received from remote server on the screen, these instances are created and stored in one or more objects at the OCD (12). The application server (8) hosts middle layer and/or integration layer (7) and a business logic layer (9). A separate process server hosts the orchestration logic (10) and communicates with the middle layer (7). Thus, the middle layer (7) is responsible for integration logic. The business rules and business process logic reside in the business logic layer (9) and the orchestration layer (10) respectively.

When the OCD (12) user is online, he/she queries and accesses data from an RGDb (11), thus, generating at least one instance of the said accessed data. The instance of the data is captured in the screen by means of predefined components thereof for data handling, the said one or more screen instances are available on the OCD (12) in an offline mode, the subsequent local changes and global structural and data specific changes are synchronized on the OCD (12) and the RGDb (11) in a next online session following the offline operation.

FIG. 1 shows a system and method (100) for deployment and maintenance of lightweight local database on the OCD (12) and synchronization of data between the local database and the RGDb. The system (100) comprising of at least one OCD (12) and the RGDb (11) is located on at least one remote server coupled to the OCD (12) via communication network. The said OCD (12) can be selected from thin client, offline client including mobile phone, computer, PDA, and laptop. According to embodiment of the invention, the said OCD(12) comprises a user interface (3), a local database (6), a module to handle data in the local data base (4), and data synchronization module (5); wherein the said user interface (3) further comprises a rendering engine (1) and an object management engine (2).

The OCD (12) have a user interface (3) for accessing data from the RGDb (11) and/or local database (6). The remote server consists of an application server (8), RGDb (11), and a process server, wherein the application server (8) houses a middle layer and/or integration layer (7) and a business logic (9). The process server has an orchestration logic (10) for management of flawless data sharing at both the ends. The integration layer and/or a middle layer (7), the business logic (9) and the orchestration logic (10) interact with the RGDb (11) and download sync and an upload sync utilities data synchronization module (5) for data flow and data synchronization between the local database (6) and the RGDb (11).

When the OCD (12) user is online, he/she queries and accesses data from the RGDb (11), thus, generating at least one instance of the said accessed data. the instance of the data is captured in the screen by means of predefined components thereof for data handling, the said one or more screen instances are available on the OCD (12) in an offline mode, the subsequent local changes and global structural and data specific changes are synchronized on the OCD (12) and the RGDb (11) in a next online session following the offline operation.

In a significant embodiment of the present invention the data is stored in the form of objects on the OCD (12). Each such stored object is captured in the form of a screen instance disposed at the OCD (12) when the user is online. The stored objects have one or more contents stored therein one or more components. Each component possesses uniform shape, size, format, and semantics.

The screen has two types of components depending on the object description. First component is related to object of the screen accessed while online and stored at OCD (12) of offline use. The second component is separate object created to accommodate the updates made in the screens in an offline mode and subsequently streamed to the RGDb (11).

The components usually maintain the same shape, size, format and other semantics. Thus the contents of a screen can be stored by a user, using object management engine (2). The user can exploit the contents of the screen either as a single object in a local database (6) or as an object broken up into its parameters. The broken up parameters of an object are stored in a table and/or file in a local database (6).

According to one embodiment of the invention, the object management engine (2) chooses to store the content of a screen as a single object in a local database (6) in the OCD (12). An underlined schema in the local database (6) consists of a single table and/or file. The table and/or file consist of two columns, the first column contains a primary key and the second column contains an object repository. The primary key to the table and/or file is a screen ID and the column which holds an object holds a screen corresponding to the screen ID in its object format. This is a very simplistic method and has the ability to store just one instance of each screen. Each screen which is accessed online by the user will be stored in its last viewed state in the local database (6). Thus, once the user goes offline, only the last viewed state of each screen accessed while user was online, would be viewable. The screens which had not been accessed in the online mode would not be available for viewing in the offline mode.

According to another embodiment of the invention, the object management engine (2) chooses to store the contents of a screen as an object broken up into its parameters and then stored in a table and/or file in a local database (6) in the OCD (12). The said local data base (6) has a table and/or file for every screen accessed by the end user. The screen is split into parameters which are mapped to columns in a single table and/or file. This table and/or file will contain data displayed in the particular screen only and will not be related in any manner to other tables and/or files in the database. This is because the other tables and/or files too would be essentially associated to respective one screen only. The changes occurring in one screen would not be reflected on the other screen in an offline mode. This is because in an offline mode the screen would be able to access only the table and/or file associated with it. In an online mode, user can access the RGDb (11) and upon data synchronization, the entire screens are updated and user can see updated data in all screens at the RGDb (11). The relational changes to data on one screen trigger associated changes to data seen in another screen while online. The screens so accessed at RGDb (11) are again instantiated and stored at the OCD (12) in the last accessed state.

Both the above mentioned methods of storing the contents of the screens can be extended to hold several instances of the same screen. This is made possible by generating a unique ID for every instance of the screen and the end user can control queries to the local database (6) through an offline application. The offline application facilitates rendering of the required instances onto the required screen by means of a rendering engine (1). The second method of storing contents of the screens in the local database (6) in the OCD (12) offers more ease to implement this extension as it is possible to generate a unique ID from a subset of the parameters the screen is split up into. The second method of storing the contents of the screens also allows querying the local database (6) in the offline mode with relative ease. The queries in method of storing the contents of the screens could span several instances of the same screen whereas in the first method of storing the contents of the screens, the screens are stored as objects and the internals of the object cannot be queried.

According to one embodiment of the invention, lightweight local database (6) for OCDs (12) is created at the OCD (12), this is because in a screen based local database (6) only the screens accessed by the end users have tables and/or files which get created and associated with them. Thus the local database (6) is tailor made to the users need and does not hold unwanted data or relationships.

According to one embodiment of the invention, the local database (6) in the OCD (12) is screen based and non relational with the RGDb (11). The creation and maintenance of the local database (6) is done locally and changes to the structures and contents of the local database (6) are done by actions carried out by the end user. The local storage is completely maintained and configured locally. The actions on the screen can trigger statements for table and/or file creation/deletion as well as data addition/deletion.

In another embodiment of the invention, a human computer interaction (HCI) particularly from users' behavioral aspects are simplified wherein user, at the occasionally connected device (12), while accessing screens needn't be conscious about the system configuration and maintenance operations. The configuration and maintenance of the local database (6) is triggered by automatic management of the screen objects associated therewith each data elements and updated by each data access session of the user. For example SQL statements, to check for the existence of a table and/or file and the creation of the table and/or file, can be embedded in the application installed on the client. Every time a user accesses a screen for the first time the code will create a table and/or file for that screen with a structure suitable to store the contents of the screen. This table and/or file will not have any relation to the table and/or file of another screen on the local database. This shall be true even if the data in both tables/files has common components and in the RGDb (11) there exist some relation between these two components of data. Maintaining non relational tables and/or files is relatively simpler and support for complex relations between tables and/or files is limited in current technology which is mentioned in http://livedocs.adobe.com/flex/3/langref/localDatabaseSQLSupport.html.

According to one embodiment of the invention, the rendering engine and the object management engine of OCD (12) displays one or more data instances on the screen and OCD (12) have module (4) to handle local data of the OCD (12).

The changes made in the offline mode by the user need to be stored in a format which would be understood by the integration logic and/or middle layer (7), the business logic (9), and the orchestration layer (10). This format is usually an object which can also be stored in the local database (6). Once the user is online the series of objects which hold the offline changes can be streamed to the integration layer and/or middle layer (7) using upload sync utility of the data synchronization module (5) and their responses which return through the loop of the business logic (7), orchestration (9), and RGDb (11) can be sent to the local storage and the display.

All Create, Read, Update, and Delete (CRUD) operations can be performed on the local database (6) while the user is offline. While the user is online the CRUD operations will have to be performed for both the RGDb (11) and the local database (6). These operations will be carried out by two separate layers of code as the structure of the two databases is different.

According to one embodiment of the invention, the rendering engine (1) handles the screen painting, whereas the object management engine (2) packs the screen content and formatting into objects and interacts with other components in the OCD (12). A module to handle data in the local database (4) takes care of the unpacked data to be stored and extracted from local database (6) while user at the OCD (12) in online.

According to one embodiment of the invention, the object management engine (2) communicates with the data synchronization module (5) and the local database (6). The objects being returned from the remote server are streamed through the data synchronization module (5) to the object management engine (2) which further propagates them to the rendering engine to display on a screen while user in online. The RGDb (11) maintains details in a relational fashion for all data. The local database (6) on the OCD (12) update this database with the offline changes collected in their local database once the user goes online. Once the user is online, the data synchronization module (5) using the upload sync utility for querying the local database (6) streams the stored objects which contain updates to data to the RGDb (11).

Figure 2A:
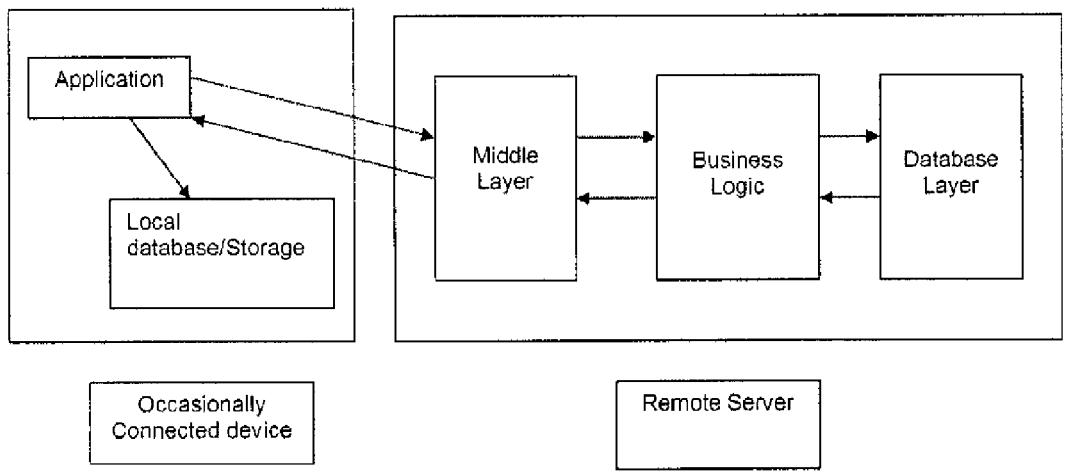
FIG. 2A illustrates data flow and data synchronization between local database and the RGDb while user is in an online mode.

FIG. 2A shows the data flow and data synchronization between local database and the RGDb (11) while user in online mode. The OCD (12) have an application and local data storage (6), and remote server having integration layer and/or middle layer (7), business logic layer (9) and database layer for data flow and data synchronization between OCD (12) and RGDb (11). If the user wants to access some data for e.g.: website page, tasks that are stored in the outlook, calendar page, etc, initially the user queries the data and sends the queries to the middle layer (7) of the remote server via communication network. The middle layer (7) will forward the requests to the business logic layer (9). The business logic layer (9) will communicate with the database layer of the RGDb and forward the response of the database layer to the middle layer (7). The Middle layer (7) will in turn process the response and send it to the user interface (3). While the user is online, any changes made to the RGDb (11) are brought down continuously ("Download Sync") to the application and local database (6) using data synchronization module (5). Once the response of the database layer rendered on the user interface (3) of the OCD (12) will get saved in the local storage/database (6).

Figure 2B:
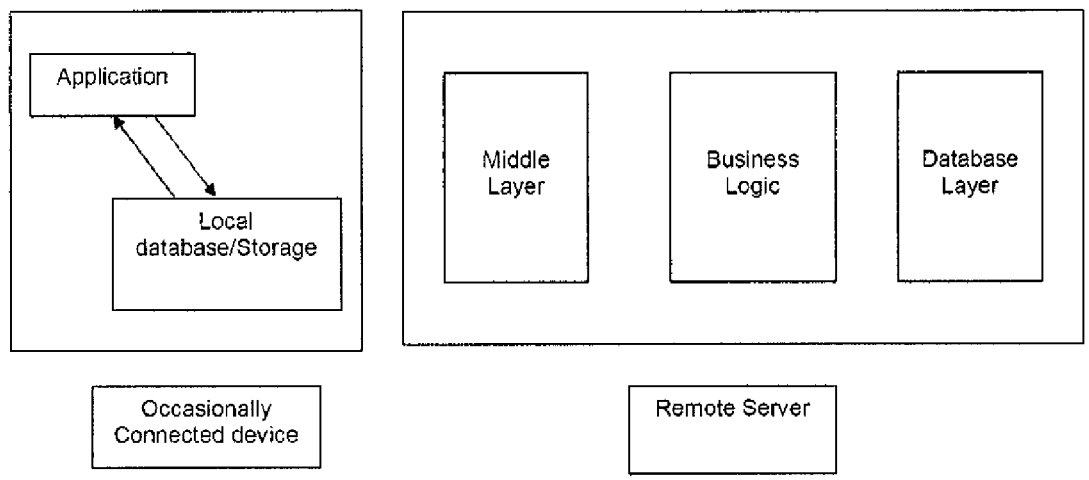
FIG. 2B illustrates data flow between the screens and the local database while user is in an offline mode.

FIG. 2B illustrates data flow between the screens and the local database while user is in an offline mode. Each screen which is accessed online by the user will be stored as objects in its last viewed state in the local database (6). Thus, once the user goes offline, only the last viewed state of each screen accessed while user was online, would be viewable. The screens which had not been accessed in the online mode would not be available for viewing in the offline mode. In offline mode, any changes made in the screen or data of the screen by the user is stored as separate objects in the local storage/database (6).

Figure 2C:
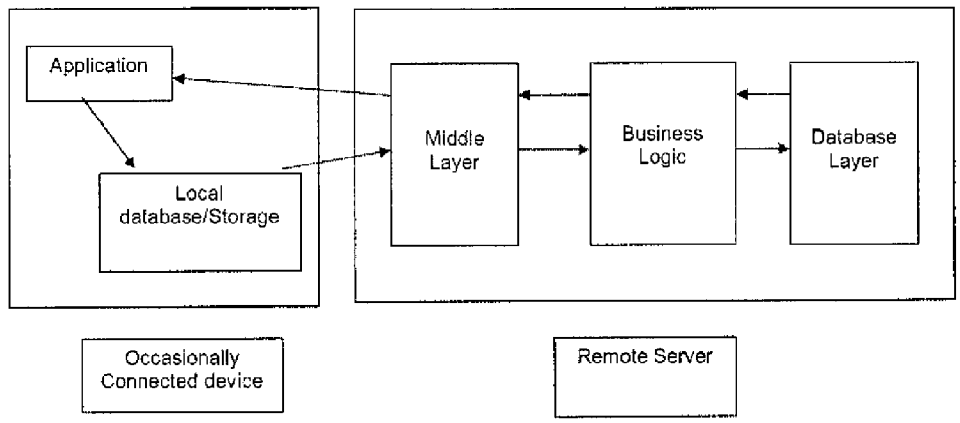
FIG. 2C illustrates data flow and data synchronization between local database and the RGDb while user goes into an online mode after being in offline mode.

FIG. 2C illustrates data flow and data synchronization between local database and the RGDb (11) while user goes into an online mode after being in offline mode. Once the user has the updates made in offline mode and it goes online then it shall synchronize those updates as shown in FIG. 2C to the RGDb (11) using the upload sync utility of the data synchronization module (5) through various successive layers. The series of objects which hold the offline changes which is made by the user in the offline mode can be sent to the integration layer and/or middle layer (7) via communication network. The middle layer (7) will forward the updates to the business logic layer (9). The business logic layer (9) will communicate with the database layer and forward the response of the database layer to the middle layer (7) using the download sync utility of the data synchronization module (5). The Middle layer (7) in turn processes the response and sends it to the user interface (3). The response of the database layer of the RGDb (11) is rendered on the user interface (3) of the OCD (12) and this response is saved in the local storage and/or database (6).

According to one exemplary embodiment of the invention, once the client goes online, it streams the stored changes to the remote server and in this fashion "Upload Sync" is performed. The data synchronization between the local database (6) and RGDb (11), when user goes from offline into online mode, takes place by means of the upload sync utility of the data synchronization module (5). The data synchronization module (5) will query the local database (6) for updated objects and then stream them to the remote server. The upload sync utility of the data synchronization module on the screen should be activated only after the client goes online.

The local data synchronization module (5) will stream the offline objects to the RGDb (11) and direct their responses to the screen to the local database (6). After this a query is forwarded to the RGDb (11) with screen information as parameters. The response of this query will be stored in the local database (6).

According to another embodiment of the invention, synchronization of the data of the multiple offline users and the RGDb (11), when users goes from offline into online mode, takes place by means of upload sync utility of the data synchronization module (5). For e.g.: The synchronization at the RGDb (11) will be based on a first come first served policy. In case multiple team members are assigned a task and they worked on the same data offline, then whoever goes online first and syncs up the data using upload sync utility of the data synchronization module (5) his/her data is synchronized and saved first to the RGDb (11).

According to one embodiment of the invention, the local database (5) is encrypted and not available on any port for queries, the login credentials can be stored offline too. When the OCD (12) is offline the access to user in the local database (6) is protected through login and password.

The general data flow process between the OCD (12) and the RGDb (11) is explained as follows. According to one embodiment of the invention, the OCD (12) comprises thin client, and offline client including mobile phones, computers, PDAs and laptops. Each of OCD (12) would have a user interface, a module to handle one or more objects, a data synchronization module (5), a local database (6), and a module to handle one or more tasks in the local database. If the user wants to access some data for e.g. website page, tasks are stored in the outlook, calendar page, etc; initially the user queries the data in the presentation layer and sends the queries to the middle layer and/or the integration layer (7) via communication network. The presentation layer is capable of communicating with the middle layer (7) through built in services offered by the technology used for occasionally connected devices. For e.g. it uses HTTP service to send a few parameters to the middle layer. While online the presentation layer can use HTTP service to communicate with the middle layer (7).

The presentation layer is capable of communicating with the middle layer (7) through both built in services offered by the technology used. While online the presentation layer can use HTTP service or remoting service to communicate with the middle layer (7). Remoting is suited to large amounts of data transfer while HTTP service is more suited to sending a few parameters. If offline and online functioning is needed then remoting is a necessity.

The middle layer forwards the requests to the business logic layer (9). The Middle layer (7) is capable of handling communication through HTTP service and remoting service. The Middle layer (7) contains code to accept parameters sent over HTTP service. HTTP service is used only when a small amount of data needs to be transmitted. The parameters sent across over HTTP service are used to query the RGDb (11) through the business logic layer (9) to obtain data typically for a screens page load. The page load details are sent to the presentation layer in the form of XML templates from the middle layer (7) in case HTTP service was used. The middle layer (7) communicates with business logic layer (9), orchestration layer (10) and presentation layer.

The business rules and the business process logic reside in the business logic layer (9) and the orchestration layer (10) respectively. The business logic layer (9) and orchestration layer (10) are to manage the business processes and orchestrate them, which means these layers are for controlling "what happens" and "What happens next" and "Notify so-and-so as to what has happened" in a business process.

The business logic layer (9) may be built in Java. The business logic layer (9) obtains data from the Middle layer (7) and passes the request onto Data access object layer (DAO layer), the DAO layer translates action script objects into java objects and then sends to the database layer. The orchestration layer (10) communicates with the Middle layer (7) and the business layer (9) through web services exposed over a Java client. The orchestration layer (10) also accesses the database layer. The business logic layer (9) communicates with the database layer of the RGDb (11) and forwards the response of the database layer to the middle layer (7). The Middle layer (7) will in turn process the response and send it to the user interface (3). The response once rendered on the user interface will get saved into the local database.

Figure 3:
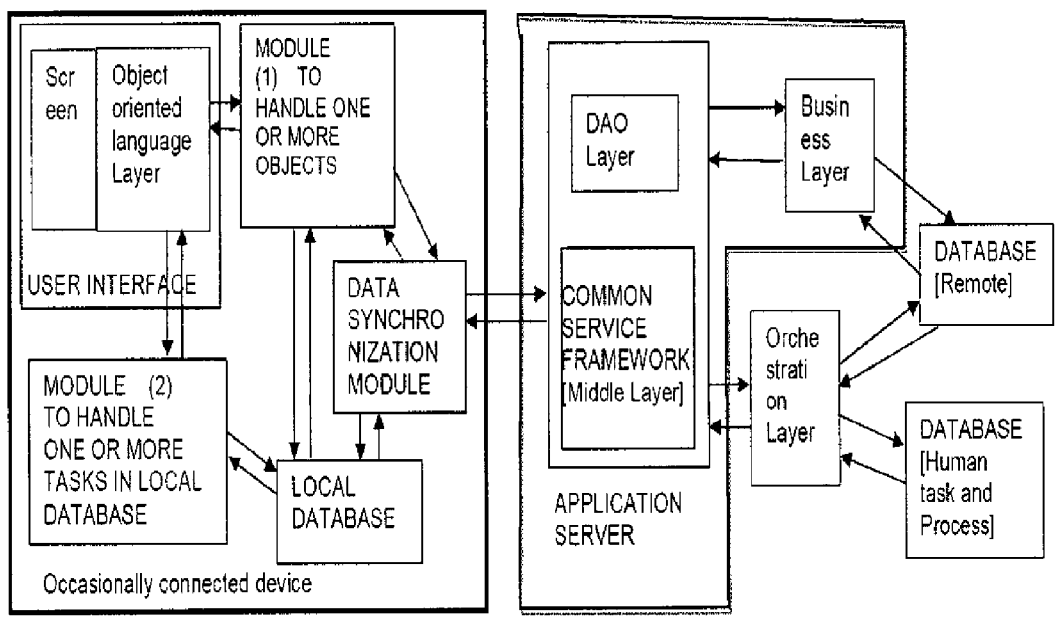
FIG. 3 depicts architecture for the OCD having a user interface, a module to handle one or more objects, a data synchronization module, a local database, and a module to handle one or more tasks in the local database for desktop application and its communication with RGDb.

FIG. 3 depicts architecture for the OCD (12) having a user interface, a module to handle one or more objects, a data synchronization module, a local database, and a module to handle one or more tasks in the local database for desktop application and its communication with RGDb (11).

According to one embodiment of the invention, the database (6) will act as a repository of objects which could be retrieved by the data synchronization module (5) and sent to the middle layer (7).

The objects generated on the screen are transmitted to a module to handle one or more objects i.e. MODULE 1. This module stores the objects to the database (6). Since the objects are related to a screen, some metadata containing a unique action ID will have to be generated and sent to MODULE 1. MODULE 1 further sends this metadata to the database accompanying the objects.

MODULE 1 also communicates with the Data Synchronization module (5) while the user is connected to the internet. This enables receipt of the objects being returned from middle layer (7) on the return path of the transactions once the user goes online. A module to handle one or more tasks in local database i.e. MODULE 2 communicates between the screens as well as the local database (6). In this case data is sent as objects but will be sent in conventional data format such as integer, real etc. This is needed to run queries on local data when the user is offline. The SQL query statement will not be able to extract or mine whatever is within a BLOB data type, which is the data type used to store serialized objects.

Once the user is online the Data Synchronization module (5) will have to query the local database and extract a list of actions performed offline and their associated objects. These objects will then be transmitted to the middle layer, which further communicates with the business layer and the orchestration layer. The responses which are sent back by the business layer and the orchestration layer are redirected by the Data Synchronization module (5) to MODULE 1. MODULE 1 sends these objects further to be displayed on the screen. Once the objects are decoded at the user Interface (3) the MODULE 2 will update the local database (6).

According to various embodiments of the invention, any changes occurred in the RGDb (11) will not affect the local data base, so the memory to store local database (6) in the OCD (12) leads to small footprint, low complexity and easy maintenance. The following scenarios shall further explain the data sharing methodology employed in the present invention.

a) The relational changes in the RGDb (11) will not be reflected in the local database and the relational changes in the RGDb (11) will not cause any maintenance changes in the local database. For example if tables and or files A, B and C are related i.e. changes in A is automatically propagated to B, and C in the RGDb (11). Such relationships shall not hold in the local database and changes in the RGDb (11) in terms of relations shall not affect the local database.

b) In case there is a structural change in the RGDb (11). For example an extra column is added in a table and/or file and the contents of that particular column have to be displayed on the screen. Then the code for the intermediate layers will have to change to support the extra field and the user interface code will have to accommodate this change. In the architecture of the present invention the user interface is not a browser decoding HTML but is a desktop application which can only display a fixed set of fields, tables and/or files, images, etc in a fixed template. The code to render such a screen need to be changed if an extra field has to be displayed. However the code to store the screen into the local database as an object need not be changed.

c) In case structural changes are predicted then the code of the application preemptively assesses the need for extra fields and they can be enabled by the responses being sent by the remote server. However such management has not been attempted or implemented in the present invention.

d) In case the application has to be updated. It is possible to do so without loosing the local storage. However certain considerations have to be taken while mentioning the data binding. The data which is strongly bound may not be readable after the update.

EXAMPLE

The invention is described in the example given below which is provided only to illustrate the invention and therefore should not be construed to limit the scope of the invention.

The invention as claimed and described herein is preferably illustrated for implementation of distributed operations wherein there are multiple clients accessing data from a remote central server. The expectations from such a system are it should provide best operability, maintenance, data integration, and ease of data handling to the distributed clients.

Accordingly, a scenario wherein a team leader who is responsible for reviewing the work accomplished by his/her subordinates requires an efficient defect tracking and management system. In such defect tracking and management system the subordinate team members and the team leader—a reviewer are geographically distributed are communicatively connected to the Remote Global Database (RGDb). The team members with Occasionally Connected Device (OCD) including one from the set of laptop, computer, PDA, mobile, etc. are connected with the RGDb server. Accordingly, the present invention offers crucial advancements in data sharing and defect tracking/management in the above scenario. The system shall work as follows: Initially the reviewer receives and sees the tasks allotted to him at his OCD display. The reviewer assigns one or two tasks to each members of the team. Once the tasks are assigned, both reviewer and team members can view tasks allotted to them in their respective work list in the online mode and the screens are accessed by the team members in an online mode are stored as an object in the local database in the occasionally connected device.

Subsequently, the team members initiate work on their respective tasks in the OCD either in offline or online mode. Accordingly, the changes are effectuated in the screens accessed from the remote server. The changes are stored in the form of respective updated objects associated with the each screen in the local database. In a next online session when the team member/members go online from the offline mode, the changes made in the screens are streamed to RGDb. Thus the reviewer can access and review defect entry screen which is updated in the OCD and verify the data in the defect entry. Further, a reviewer can also add defects for a particular review task in the screen and stored in the RGDb. The team member can access the screen updated by the reviewer in his OCD when he is online again. The screens are saved as objects in the local database, so it consumes low footprint and are less complex as compared to the replicas of the database. As the objects stored at OCDs consume low footprint and are handled by the locally installed lightweight application without any relational aspects hence are low on operation and maintenance.

In this manner, the reviewer and team member can effectively and efficiently work together to manage and track defects environment. Also the tracking screens available to reviewer and team members allow greater level of transparency while tracking the progress of a project.

Likewise the present invention can be implemented to variety of other distributed applications including inventory management, planning, and estimation.

The preceding description has been presented with reference to various embodiments of the invention. Persons skilled in the art and technology to which this invention pertains will appreciate that alterations and changes in the described systems and methods of operation can be practiced without meaningfully departing from the principle, spirit and scope of this invention.

We claim:

1. A method for sharing data between an occasionally connected device and a remote global database communicatively coupled to the occasionally connected device, the method comprising:

receiving, by the occasionally connected device, the data from the remote global database, wherein the data is accessed by a user in an online mode;

storing the data in a form of one or more screen instances in a local database of the occasionally connected device, wherein the one or more screen instances are stored as a single object in the local database, wherein the one or more screen instances capture contents of a screen accessed by the user, and wherein the one or more screen instances are last viewed instances of the screen accessed by the user in the online mode, and wherein the local database is a non-relational database;

querying the local database of the occasionally connected device for the one or more screen instances;

updating the one or more screen instances in an offline mode based on a user input to generate one or more updated screen instances, wherein the one or more updated screen instances are stored as a separate object broken into parameters and stored on at least one of a table and a file within the local database of the occasionally connected device, wherein the at least one table and file further comprise at least a primary key column and an object repository column, wherein a screen ID for the one or more updated screen instances is indicated in the primary key column and at least one object of the one or more updated screen instances corresponding to the screen ID is indicated in the object repository column, wherein the primary key and object repository columns are updated based on the at least one user input; and synchronizing, in the online mode, the one or more updated screen instances with the remote global database to update the data stored in the remote global database, wherein the data corresponds to the one or more screen instances.

2. The method of claim 1, wherein the occasionally connected device comprises a thin client, and an offline client including mobile phone, computer, personal digital assistant (PDA), and laptop having a user interface.

3. The method of claim 1, wherein the remote global database is a relational database.

4. The method of claim 1, wherein each instance of the one or more screen instances is assigned a unique ID.

5. The method of claim 1, wherein the one or more updated screen instances are obtained by performing Create, Read, Update, and Delete (CRUD) operations on the local database.

6. An occasionally connected device for sharing data with a remote global database communicatively coupled to the occasionally connected device, the occasionally connected device comprising:

a processor; and a memory coupled to the processor, wherein the processor is capable of executing program instructions stored in the memory, the program instructions that are configured to cause the processor to:

receive the data from the remote global database, wherein the data is accessed by a user in an online mode;

store the data in a form of one or more screen instances in a local database of the occasionally connected device, wherein the one or more screen instances are stored as a single object in the local database, wherein the one or more screen instances capture contents of a screen accessed by the user, and wherein the one or more screen instances are last viewed instances of the screen accessed by the user in the online mode, and wherein the local database is a non-relational database;

query the local database of the occasionally connected device for the one or more screen instances;

update the one or more screen instances in an offline mode based on a user input to generate the one or more updated screen instances, wherein the one or more updated screen instances are stored as a separate object broken into parameters and stored on at least one of a table and a file within the local database of the occasionally connected device, wherein the at least one table and file further comprise at least a primary key column and an object repository column, wherein a screen ID for the one or more updated screen instances is indicated in the primary key column and at least one object of the one or more updated screen instances corresponding to the screen ID is indicated in the object repository column, wherein the primary key and object repository columns are updated based on the at least one user input; and synchronize, in the online mode, the one or more updated screen instances with the remote global database to update the data stored in the remote global database, wherein the data corresponds to the one or more screen instances.

\* \* \* \* \*